United States Patent
Reece et al.

(10) Patent No.: US 6,516,971 B1
(45) Date of Patent: Feb. 11, 2003

(54) APPARATUS AND METHOD OF SENSING TEMPERATURE OF AN ELECTRIC VALVE

(75) Inventors: Daryl Reece, Atlanta, GA (US); Laurence B. Saidman, Duluth, GA (US); David J. Zgonc, Atlanta, GA (US)

(73) Assignee: Nordson Corporation, Westlake, OH (US)

(*) Notice: Subject to any disclaimer, the term of this patent is extended or adjusted under 35 U.S.C. 154(b) by 0 days.

(21) Appl. No.: 09/699,617

(22) Filed: Oct. 30, 2000

(51) Int. Cl.⁷ .................................................. B67D 5/62
(52) U.S. Cl. ...................... 222/146.5; 222/504; 222/54; 392/474; 392/479; 219/424
(58) Field of Search .............................. 222/146.5, 504, 222/54; 374/43; 219/214, 424, 425, 420; 392/474, 479, 475, 473

(56) References Cited

U.S. PATENT DOCUMENTS

| | | | | |
|---|---|---|---|---|
| 2,620,229 A | * | 12/1952 | Schumacher | 299/28.7 |
| 3,574,897 A | * | 4/1971 | Citron et al. | 18/30 QH |
| 3,864,544 A | * | 2/1975 | Van Amerongen | 219/301 |
| 4,032,041 A | * | 6/1977 | Bruce | 222/63 |
| 4,066,188 A | * | 1/1978 | Scholl et al. | 222/146 |
| 4,279,588 A | * | 7/1981 | Gellert | 425/568 |
| 4,309,592 A | * | 1/1982 | Le Boeuf | 219/299 |
| 4,355,912 A | * | 10/1982 | Haak | 374/208 |
| 4,711,379 A | * | 12/1987 | Price | 222/504 |
| 4,785,996 A | * | 11/1988 | Ziecker et al. | 239/298 |
| 4,949,556 A | * | 8/1990 | Knauss | 68/16 |
| 4,969,601 A | * | 11/1990 | Wright | 239/135 |
| 4,969,602 A | * | 11/1990 | Scholl | 239/298 |
| 5,065,943 A | * | 11/1991 | Boger et al. | 239/298 |
| 5,407,101 A | * | 4/1995 | Hubbard | 222/146.5 |
| 5,533,648 A | * | 7/1996 | Read et al. | 222/108 |
| 5,747,102 A | * | 5/1998 | Smith et al. | 427/96 |
| 6,036,106 A | * | 3/2000 | Peet | 239/135 |
| 6,089,413 A | * | 7/2000 | Riney et al. | 222/318 |
| 6,220,749 B1 | * | 4/2001 | Wyker | 374/141 |
| 6,257,445 B1 | * | 7/2001 | Means et al. | 222/1 |

* cited by examiner

Primary Examiner—Henry C. Yuen
Assistant Examiner—Frederick C Nicolas
(74) Attorney, Agent, or Firm—Wood, Herron & Evans, L.L.P.

(57) ABSTRACT

A liquid dispensing unit and method for sensing temperature of an electric valve. In one embodiment, the liquid dispensing unit includes a manifold which has a liquid passageway adapted to connect to a source of heated liquid. An electrically operated dispensing valve is coupled to the manifold. The dispensing valve includes an external surface and a liquid passageway which is in fluid communication with the liquid passageway of the manifold. The dispensing valve is selectively operative to dispense the heated liquid. The liquid dispensing unit further includes a temperature sensing device operatively associated with the dispensing valve. The temperature sensing device has a sensing element contacting the external surface of the dispensing valve to measure the temperature of that external surface and thereby indirectly measure the temperature of the heated liquid within the dispensing valve.

5 Claims, 3 Drawing Sheets

APPARATUS AND METHOD OF SENSING TEMPERATURE OF AN ELECTRIC VALVE

FIELD OF THE INVENTION

The present invention generally relates to apparatus and methods for measuring the temperature of liquid dispensing apparatus and, more specifically, the temperature of an electric dispensing valve.

BACKGROUND OF THE INVENTION

Electric viscous liquid dispensers have been developed for dispensing applications requiring precise placement of a viscous liquid. Typically, an electric dispenser is coupled to a manifold which is connected to a supply of viscous thermoplastic liquid such as hot melt adhesive. Collectively, the electric dispenser and the manifold serve as a liquid dispensing unit. Viscous thermoplastic liquids, such as hot melt adhesive, solidify at lower temperatures. Therefore, they must remain heated as they flow through the manifold and the electric dispenser. Accordingly, the manifold may incorporate a heating device to maintain the hot melt adhesive in the manifold and in the electric dispenser at the appropriate application temperature.

A temperature sensing device incorporated within the manifold effectively monitors the temperature of the hot melt adhesive in the manifold. However, the electric dispenser usually does not include a temperature sensing device as it is assumed that the temperature of the hot melt adhesive in the manifold is equivalent to the temperature of the hot melt adhesive in the electric dispenser. For pneumatically actuated dispensers, this assumption is acceptable as the operation of a pneumatically actuated gun does not generate appreciable heat which would tend to increase the temperature of the hot melt adhesive flowing therethrough. For electric dispensers, however, this assumption may not be accurate.

Activating the electric coil of an electric dispenser can generate considerable additional heat. Excessively elevated temperature can have undesirable effects on the characteristics of the hot melt adhesive and the valve performance. For instance, the increase in temperature may degrade the integrity of the adhesive, making accurate dispensing difficult if not impossible. In addition, the increase in temperature may affect the valve performance by altering the valve's response time. Also, the temperature of the electric coil may become so elevated that it may exceed the melting point of the insulation around the coil wire.

Consequently, measuring the temperature of the hot melt adhesive within the manifold may not provide sufficient temperature information for the electric dispenser and the hot melt adhesive flowing therethrough. The industry therefore needs improvements related to monitoring the temperature of the electric dispenser, instead of only the manifold. Monitoring the temperature of the electric dispenser will better protect against overheating the viscous liquid and the electric coil during operation of the liquid dispensing unit.

SUMMARY OF INVENTION

The present invention provides a heated liquid dispensing unit that overcomes the drawbacks of past units as described above. The invention is particulary directed to overcoming problems associated with dispensing units incorporating an electrically actuated dispenser and dispensing thermoplastic liquids. In accordance with the principles of the present invention, the liquid dispensing unit includes an electrically operated dispensing valve which is adapted to couple to a source of heated thermoplastic liquid and is selectively operative to dispense the heated thermoplastic liquid. The dispensing valve has an external surface. A temperature sensing device is operatively associated with the dispensing valve and has a sensing element contacting the external surface of the dispensing valve. The temperature sensing device is operative to measure the temperature of the external surface and thereby indirectly measure the temperature of the heated liquid therein. The sensing element may be a resistance temperature detector (RTD), a thermocouple, or any other suitable temperature sensor.

In another embodiment, the liquid dispensing unit includes a manifold which has a liquid passageway adapted to connect to a source of heated thermoplastic liquid. An electrically operated dispensing valve is coupled to the manifold. The dispensing valve includes an external surface and a liquid passageway which is in fluid communication with the liquid passageway of the manifold. The dispensing valve is selectively operative to dispense the heated thermoplastic liquid. The liquid dispensing unit further includes a temperature sensing device operatively associated with the dispensing valve. The temperature sensing device has a sensing element contacting the external surface of the dispensing valve to measure the temperature of that external surface and thereby indirectly measure the temperature of the heated thermoplastic liquid within the dispensing valve.

In another aspect of the invention, the manifold also has a first mating surface. The electrically operated dispensing valve has a second mating surface which is coupled to the first mating surface of the manifold. The dispensing valve has a liquid passageway which is in fluid communication with the liquid passageway of the manifold. The dispensing valve is selectively operative to dispense the heated thermoplastic liquid. The liquid dispensing unit further includes a temperature sensing device affixed to the manifold. The temperature sensing device includes an elongated member with an end which extends through the manifold and sensing element affixed to that end. A biasing member is operatively coupled to the elongated member to bias the sensing element into positive engagement with the second mating surface of the dispensing valve to measure the temperature of that mating surface and thereby indirectly measure the temperature of the heated thermoplastic liquid within the dispensing valve. One main advantage of this embodiment is that removal of the dispensing valve does not require disruption of the temperature sensing device or its wiring.

The present invention also includes a method for sensing the temperature of a heated thermoplastic liquid flowing through a dispensing valve coupled to a manifold and having an electrically operated actuator and an external surface. The method includes directing the heated thermoplastic liquid from the manifold to the dispensing valve and heating the external surface of the dispensing valve with heat generated by the actuator and heat dissipating from the heated thermoplastic liquid. The temperature of the liquid is then measured by sensing the temperature of the external surface of the dispensing valve.

Various additional advantages and features of the invention will become more readily apparent to those of ordinary skill in the art upon review of the following detailed description taken in conjunction with the accompanying drawings.

DETAILED DESCRIPTION OF DRAWINGS

DETAILED DESCRIPTION OF PREFERRED EMBODIMENTS

Figure 1:
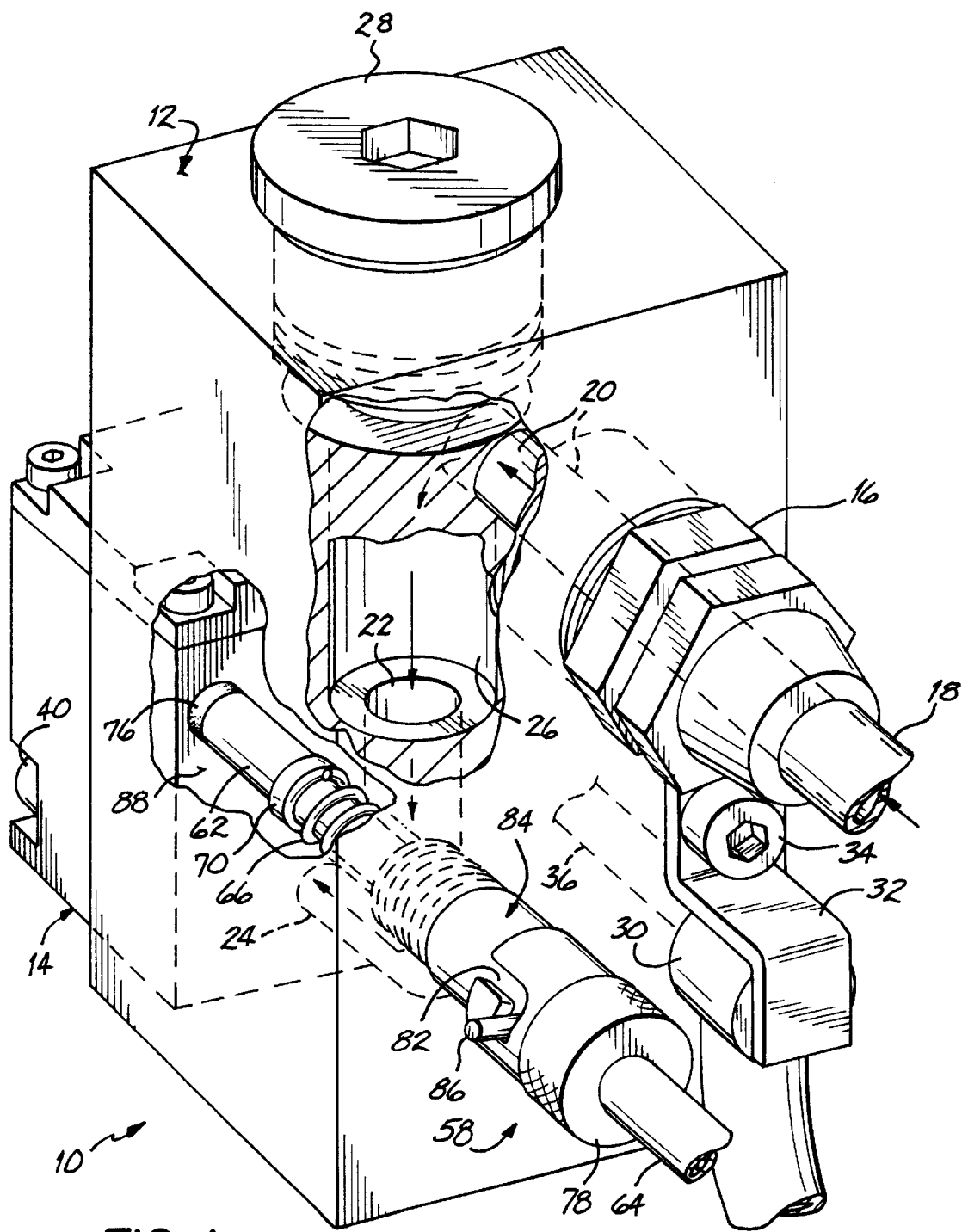
FIG. 1 is a partially cut away perspective view of a liquid dispensing unit incorporating a temperature sensing device.

With reference to FIG. 1, a liquid dispensing unit 10 includes a manifold 12 coupled to an electrically operated dispensing valve 14. Manifold 12 includes a liquid inlet 16 to which a supply line 18 detachably connects. Supply line 18 is connected to a supply tank of thermoplastic liquid (not shown), such as hot melt adhesive. Liquid entering through liquid inlet 16 traverses across liquid passageway 20, down liquid passageway 22, and out liquid passageway 24 which is coupled directly to electric valve 14. Liquid passageway 22 includes an enlarged cavity 26 which may include a filter (not shown) to filter the liquid flowing through the manifold 12. Accordingly, manifold 12 includes a filter cap 28 which can be selectively removed to allow the filter to be inserted and periodically replaced.

In some applications, the liquid dispensing unit 10 will be used to dispense adhesives such hot melt adhesive. It will be appreciated that the invention is useful when dispensing other heated liquids from electric valves as well. Hot melt adhesive is typically solid at room temperature, and therefore, must be heated to a molten state before it can be dispensed. To heat, and then maintain, the hot melt adhesive within a predetermined elevated temperature range, the supply tank, the supply line 18 and the manifold 12 must be heated. To that end, a heating device 30 is detachably coupled to manifold 12 by retaining clip 32 and fastener 34. Heating device 30 operatively connected to a controller (not shown) which selectively operates the heating device 30 to maintain hot melt adhesive within the appropriate temperature range. Heating device 30 includes a portion 36 which is slidably inserted into the interior of manifold 12. Portion 36 includes heating elements (not shown) which are selectively operative to heat the manifold 12.

Electric valve 14 is detachably coupled to manifold 12 by fasteners 40 located on both sides of the electric valve 14. Electric valve 14 includes liquid passageway 42 which couples to liquid passageway 24 to receive hot melt adhesive therefrom. Electric valve 14 also includes a valve body 44 and a valve seat 46. Valve body 44 is operatively coupled to an electromagnetic coil (not shown) such that valve body 44 can be selectively controlled to engage or disengage valve seat 46. When valve body 44 is disengaged from valve seat 46, hot melt adhesive can flow through the electric valve 14 and be dispensed out an orifice 48.

Figure 2:
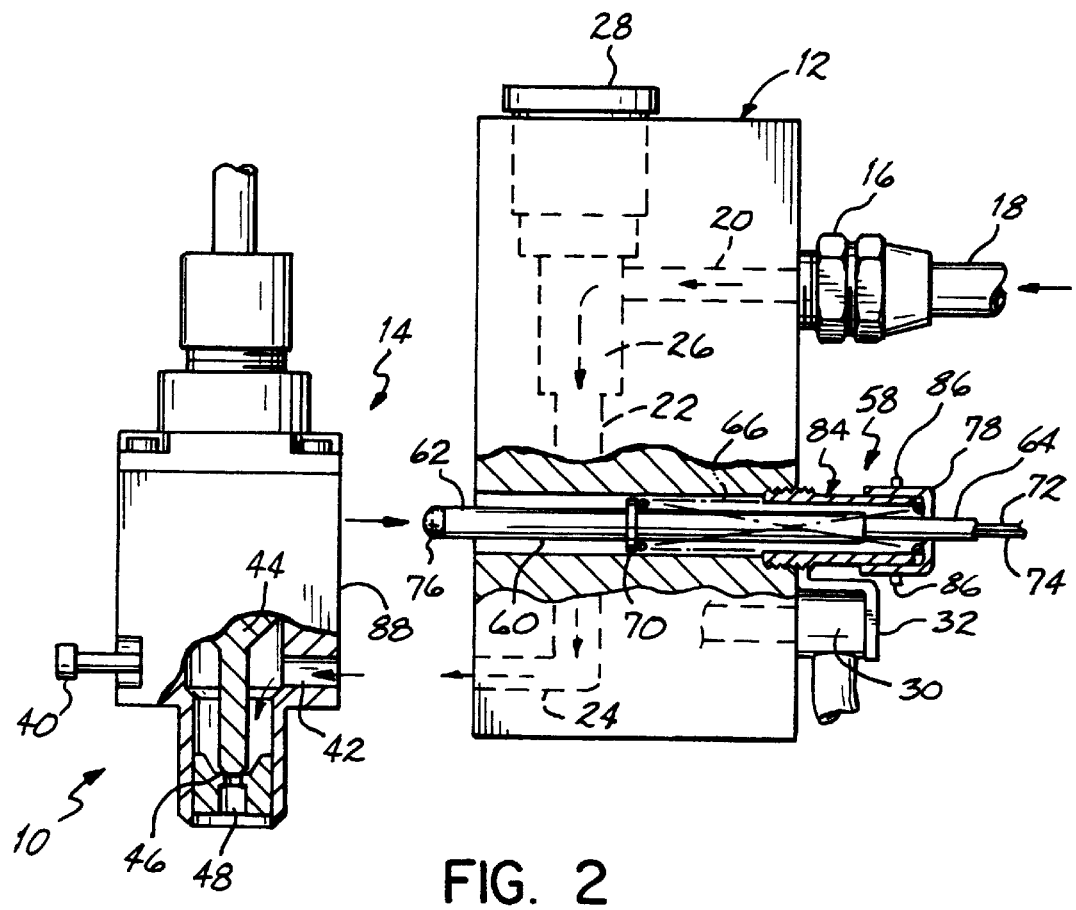
FIG. 2 is a partially cut away disassembled plan view of the liquid dispensing unit of FIG. 1.
Figure 3:
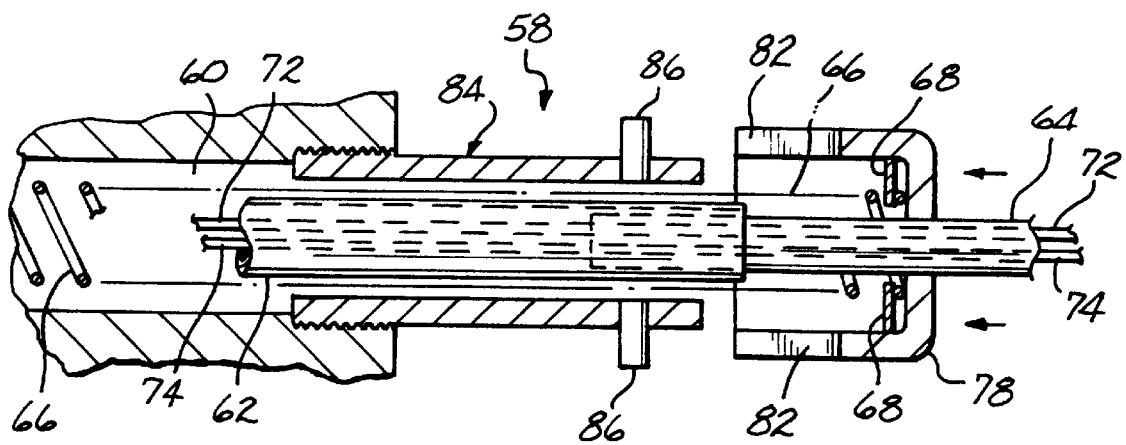
FIG. 3 is a partial enlarged cross sectional view of the temperature sensing device of FIG. 1.

The temperature of the hot melt adhesive in the liquid dispensing unit 10 must be monitored to ensure that the temperature remains within the appropriate temperature range. With reference to FIGS. 1–3 and in accordance with the principles of the present invention, a temperature sensing device 58 detachably mounts to manifold 12, extends through throughhole 60 which extends from opposing sides of manifold 12 and contacts electric valve 14. Temperature sensing device 58 includes an elongated member or rod 62 which telescopically engages fixed conduit 64. A biasing member 66 couples rod 62 to conduit 64 such that rod 62 is biased away from conduit 64. Although biasing member 66 is illustrated as a coil spring in FIGS. 1 and 3, any other suitable biasing member could be used to biased rod 62 away from conduit 64. Each end of biasing member 66 is held by retaining members 68, 70 to keep the respective ends fixed relative to the conduit 64 and the rod 62. Electrical leads 72, 74 run through conduit 64 and rod 62 and are operatively coupled to a sensing element 76 located at the tip of rod 62. The sensing element 76 may be a thermocouple, a resistance temperature detector (RTD), or anything other suitable temperature sensor. The temperature sensing device 58 further includes an attachment cap 78 to which retaining member 68 is affixed. Attachment cap 78 can slide relative to conduit 64. Attachment cap 78 includes opposing slots 82. Manifold 12 includes an adapter 84 which has pins 86. To selectively mount temperature sensing device 58 to adapter 84, slots 82 of attachment cap 78 are aligned with pins 86, attachment cap 78 is slid over adapter 84 and then rotated so that slots 82 engage pins 86. Temperature sensing device 58 is removed by simply reversing this procedure.

FIGS. 1–4 illustrate temperature sensing device 58 extending through a portion of the interior of the manifold 12. It will be appreciated that temperature sensing device 58 need not extend through the interior of manifold 12. Temperature sensing device 58 could be mounted in any suitable fashion so long as the sensing element 76 contacts an external surface of the electric valve 14 so that the temperature of the external surface could be monitored. Further, the electric valve 14 could have an interiorly projecting channel or hole so that the sensing element 76 can be inserted therein. As such, the sensing element 76 could monitor the temperature of the interior of the electric valve 14 instead of just an external surface.

Figure 4:
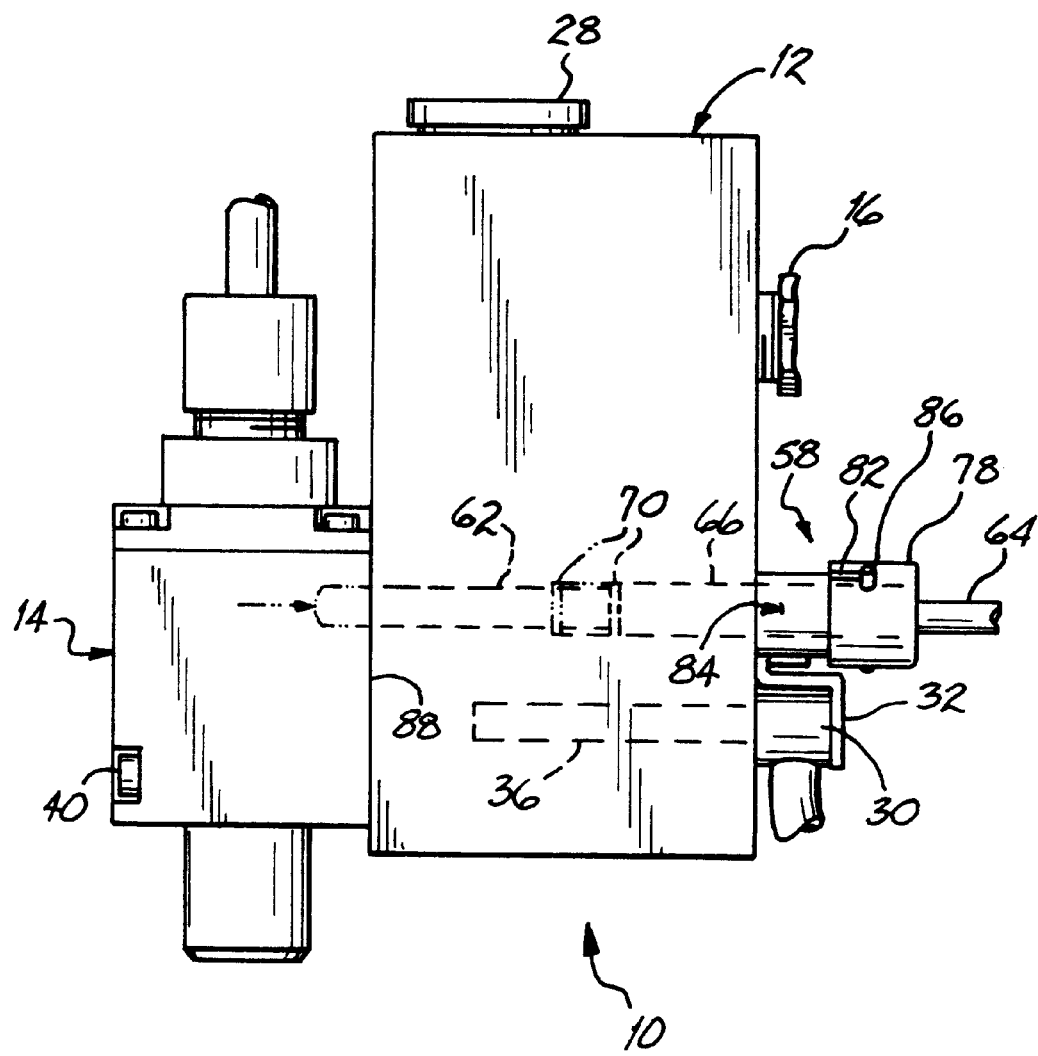
FIG. 4 is a plan view of the liquid dispensing unit of FIG. 1 showing the temperature sensing device contacting an external surface of the electric valve.

In operation, supply line 18 is attached to liquid inlet 16 and heating device 30 is inserted into manifold 12. Temperature sensing device 58 is then mounted to adapter 84 with rod 62 extending through throughhole 60. Electric valve 14 is then mounted to manifold 12 via fasteners 40. As illustrated in FIGS. 1 and 4, an external surface 88 of electric valve 14 contacts rod 62 and pushes it inwardly relative to conduit 64. When electric valve 14 is flush mounted to manifold 12, biasing member 66 biases rod 62 toward external surface 88 so that temperature sensing portion 76 makes positive contact with external surface 88. Accordingly, temperature sensing portion 76 senses the temperature of external surface 88. With temperature sensing portion 76 monitoring temperature feedback, heating device 30 is selectively operated in to maintain the liquid, such as hot melt adhesive, within the appropriate temperature range.

While the present invention has been illustrated by a description of various preferred embodiments and while these embodiments have been described in considerable detail in order to describe the best mode of practicing the invention, it is not the intention of applicants to restrict or in any way limit the scope of the appended claims to such detail. Additional advantages and modifications within the spirit and scope of the invention will readily appear to those skilled in the art. The invention itself should only be defined by the appended claims, wherein

We claim:

1. A liquid dispensing apparatus for dispensing a heated thermoplastic liquid, comprising:

a manifold having a liquid passageway adapted to connect to a source of the heated thermoplastic liquid;

an electrically operated dispensing valve having an external surface and coupled to said manifold, said dispensing valve having a liquid passageway in fluid communication with said liquid passageway of said manifold, said dispensing valve being selectively operative to dispense the heated thermoplastic liquid therefrom; and a temperature sensing device coupled to said manifold, said temperature sensing device having an elongated member and a sensing element coupled to said elongated member, said elongated member extending through said manifold and said sensing element contacting said external surface of said dispensing valve and being operative to measure the temperature of said external surface and thereby indirectly measure the temperature of the heated thermoplastic liquid therein.

2. The liquid dispensing apparatus of claim 1, wherein said temperature sensing device further comprises a biasing member to bias said sensing element into positive engagement with said external surface of said dispensing valve.

3. The liquid dispensing apparatus of claim 1, wherein said sensing element further comprises a resistance temperature detector.

4. A liquid dispensing apparatus for dispensing a heated thermoplastic liquid, comprising:

a manifold having a liquid passageway adapted to connect to a source of the heated thermoplastic liquid, said manifold having a first mating surface;

an electrically operated dispensing valve having a second mating surface coupled to said first mating surface of said manifold, said dispensing valve having a liquid passageway in fluid communication with said liquid passageway of said manifold, said dispensing valve being selectively operative to dispense the heated liquid therefrom; and a temperature sensing device affixed to said manifold, said temperature sensing device including:

an elongated member having an end, said elongated member extending through said manifold;

a sensing element affixed to said end; and a biasing member operatively coupled to said elongated member to bias said sensing element into positive engagement with said second mating surface of said dispensing valve to measure the temperature of said second mating surface and thereby indirectly measure the temperature of the heated thermoplastic liquid therein.

5. The liquid dispensing apparatus of claim 4, wherein said sensing element further comprises a resistance temperature detector.

* * * * *